(12) United States Patent
Ito

(10) Patent No.: US 7,787,069 B2
(45) Date of Patent: Aug. 31, 2010

(54) DISPLAY DEVICE AND MANUFACTURING METHOD THEREOF

(75) Inventor: Atsushi Ito, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 794 days.

(21) Appl. No.: 11/679,377

(22) Filed: Feb. 27, 2007

(65) Prior Publication Data
US 2007/0211496 A1 Sep. 13, 2007

(30) Foreign Application Priority Data
Mar. 3, 2006 (JP) ............................. 2006-057809

(51) Int. Cl.
G02F 1/1335 (2006.01)
(52) U.S. Cl. ........................................ 349/58; 349/187
(58) Field of Classification Search ................... 349/58, 349/65, 187; 361/679.21, 679.22, 679.26; 362/612, 615, 632, 633; 445/24
See application file for complete search history.

(56) References Cited

U.S. PATENT DOCUMENTS

| 2002/0024623 | A1* | 2/2002 | Kim et al. | 349/58 |
| 2003/0043310 | A1* | 3/2003 | Cho | 349/58 |
| 2005/0062902 | A1 | 3/2005 | Fukayam | |

FOREIGN PATENT DOCUMENTS

| JP | 2000-258756 | 9/2000 |
| JP | 2003-279934 | 10/2003 |

OTHER PUBLICATIONS

U.S. Appl. No. 11/679,294, filed Feb. 27, 2007, Ito et al.
* cited by examiner

Primary Examiner—Dung T Nguyen
Assistant Examiner—Tai Duong
(74) Attorney, Agent, or Firm—Oblon, Spivak, McClelland, Maier & Neustadt, L.L.P.

(57) ABSTRACT

A display device includes: a light source; a light guide plate including a light emitting surface that emits light incident from the light source; a light source board including the light source arranged thereon, the light source board arranged in close proximity to a side surface of the light guide plate; a rear frame arranged to support the light guide plate and including a protruding portion formed on a side surface of the rear frame; a middle frame arranged to support the light guide plate and the rear frame and including a notch portion where the protruding portion of the rear frame penetrate; and a display panel whose horizontal position is regulated by the protruding portion of the rear frame penetrating the notch portion of the middle frame.

7 Claims, 3 Drawing Sheets

SECTION A

DISPLAY DEVICE AND MANUFACTURING METHOD THEREOF

CROSS-REFERENCE TO RELATED APPLICATIONS

This application is based upon and claims the benefit of priority from Japanese Patent Application No. 2006-057809, filed on Mar. 3, 2006, the entire contents of which are incorporated herein by reference.

BACKGROUND OF THE INVENTION

1. Field

The present invention relates to a display device using a light source board, and manufacturing method thereof.

2. Description of the Related Art

Generally, a display device, for example a display device using liquid crystal, includes a light guide plate arranged on a surface opposite to a liquid crystal panel display surface and a light source such as a light emitting diode (LED) arranged on a side surface of the light guide plate. By propagating light from the light source in the light guide plate and diffusing the light in a diffusion pattern provided in the light guide plate, the light is extracted onto the display surface.

The display device further includes a middle frame for supporting a light guide plate arranged therein, a rear frame for supporting horizontal movement of the light guide plate arranged on a surface of the light guide plate which is opposite to the surface where a display panel is arranged, and a front frame for supporting the display frame and the middle frame and including an opening on the display surface of the display panel.

In assembling the display device, for example, there are processes as follows: reversing the middle frame; arranging a light source board with a light source arranged thereon, a light guide plate and a reflective sheet, by using a position regulating structure formed on the rear surface of the middle frame; fixing these components with a rear frame; and reversing the middle frame, light source board, light guide plate, reflective sheet and rear frame as an integrated components. The processes further includes: arranging an optical sheet by using a position regulating structure formed on the front surface of the middle frame; and fixing the optical sheet to the middle frame with an adhesive sheet. Then, the processes further includes: arranging a display panel by using a position regulating structure formed on the middle frame; and bending and caulking, or fixing with screws, fixing claws formed in plural positions of the outer edge of the front frame to the claw receiving portions formed on the circumference of the rear frame, thereby fixing and assembling the front frame and the rear frame.

In a display device disclosed in JP-A-2003-279934, an upper frame has a hole and a first protruding portion of a middle frame is fitted into the hole. A second protruding portion on the opposite side of the middle frame in the same position as the first protruding portion is fitted into a hole in a lower frame thus fixing the lower frame and the upper frame. As another example, a bent portion of a lower frame provided for positioning of a light guide plate is fitted into a hole in a middle frame to fix the bent portion thus preventing possible deformation of the bend portion.

In a display device disclosed in JP-A-2000-258756, a panel guide rib is provided on a resin frame thus supporting a liquid crystal panel.

In the above display devices, it is necessary to provide a plurality of position regulating structures on a middle frame. This complicates the structure and results in a larger frame area of a display device. A process is required to reverse a display device (reversing the front/rear surface of a display device) in assembly, which has raised a problem of an additional manufacturing process. In JP-A-2003-279934, a protruding portion formed on a middle frame must be formed on a rear frame and a front frame. This leads to a complicated structure and adds to the thickness of a display unit. Further, the protruding portion formed on a rear frame is intended to fix a light guide plate. However, there is no disclosure or teaching regarding the position regulation of a display panel. In JP-A-2000-258756, the protruding portion provided on a middle frame is intended to regulate the position of a display panel; therefore, it is necessary to provide a structure for regulating a reflective sheet, a light guide plate and an optical sheet. Another problem is that a position regulating structure of an optical sheet or a reflective sheet can be as thick as that of the optical or reflective sheet. This results in a lower position regulating capability and involves difficulty in the assembly work and displacement of the optical or reflective sheet caused by vibration or impact even after a display device is assembled.

SUMMARY OF THE INVENTION

An object of the invention is to provide a display device using a light source that can have a narrow frame area and also simultaneously regulate the positions of a display panel, a middle frame, an optical sheet, a light guide plate and a reflective sheet without increasing a manufacturing process or providing a process of reversing the display device in assembly work.

According to an aspect of the invention, there is provided a display device including: a light source; a light guide plate including a light emitting surface that emits light incident from the light source; a light source board including the light source arranged thereon, the light source board arranged in close proximity to a side surface of the light guide plate; a rear frame arranged to support the light guide plate and including a protruding portion formed on a side surface of the rear frame; a middle frame arranged to support the light guide plate and the rear frame and including a notch portion where the protruding portion of the rear frame penetrate; and a display panel whose horizontal position is regulated by the protruding portion of the rear frame penetrating the notch portion of the middle frame.

DETAILED DESCRIPTION OF THE PREFERRED EMBODIMENT

An embodiment of the invention will be described below. The description is meant to explain an embodiment of the invention and the invention is not limited to the embodiment described below. For simplicity, the description includes omissions or simplification as required. Those skilled in the art will be able to readily change, add or convert each element of the embodiment without departing from the scope and spirit of the invention.

Figure 1:
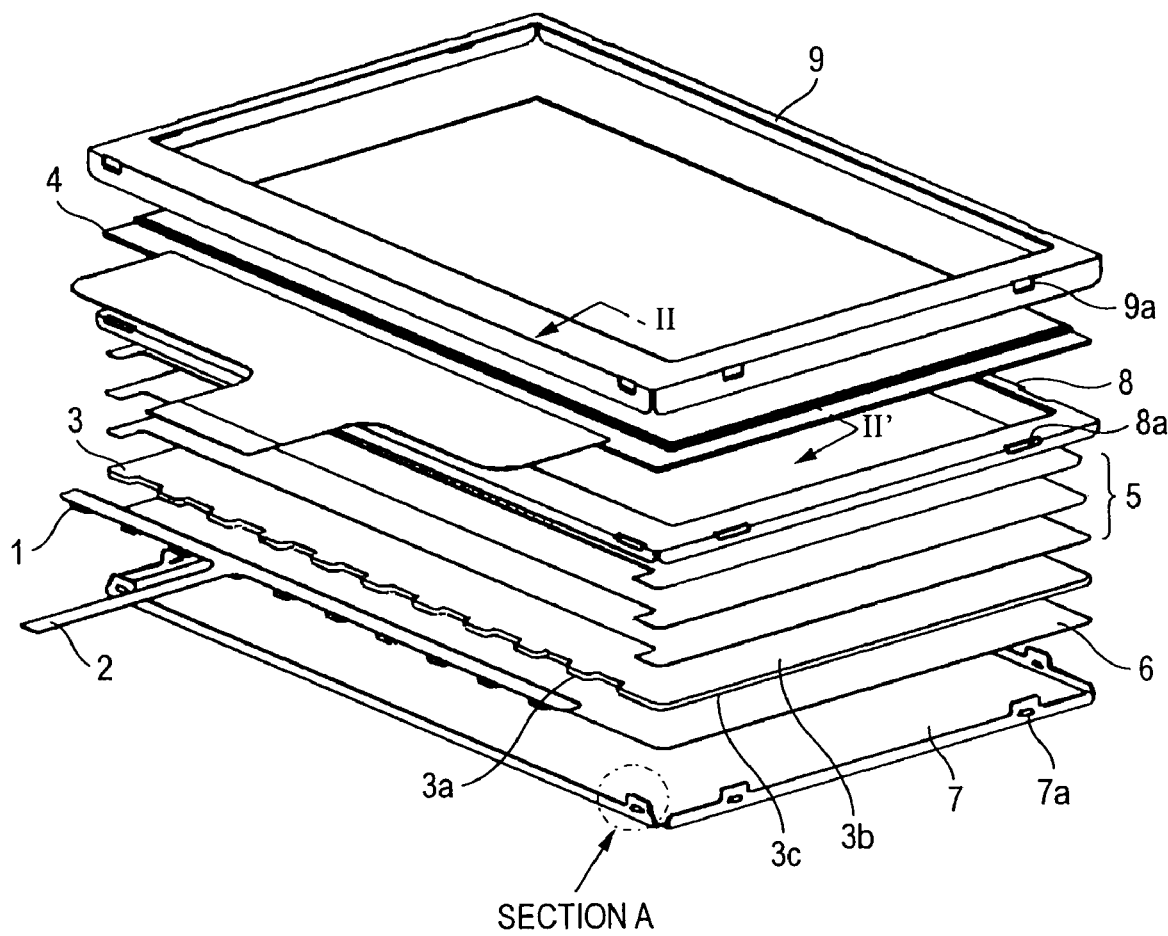
FIG. 1 is an exploded perspective view of a display device in an embodiment of the invention.
Figure 2:
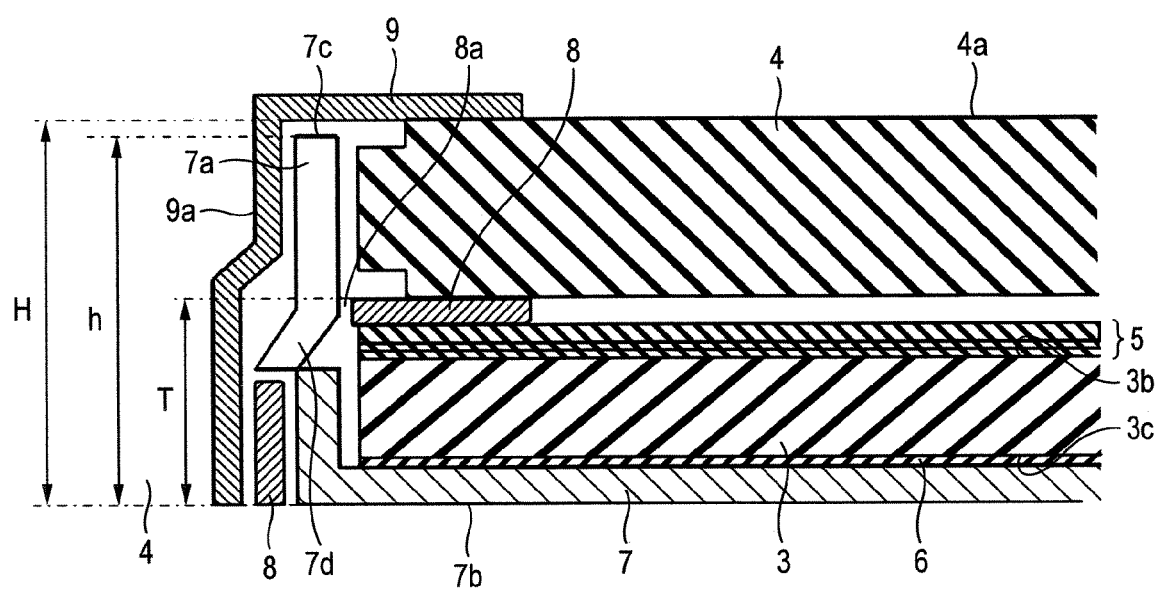
FIG. 2 is a cross-sectional view in the II-II' direction of a display device made up of the elements shown in FIG. 1.
Figure 3:
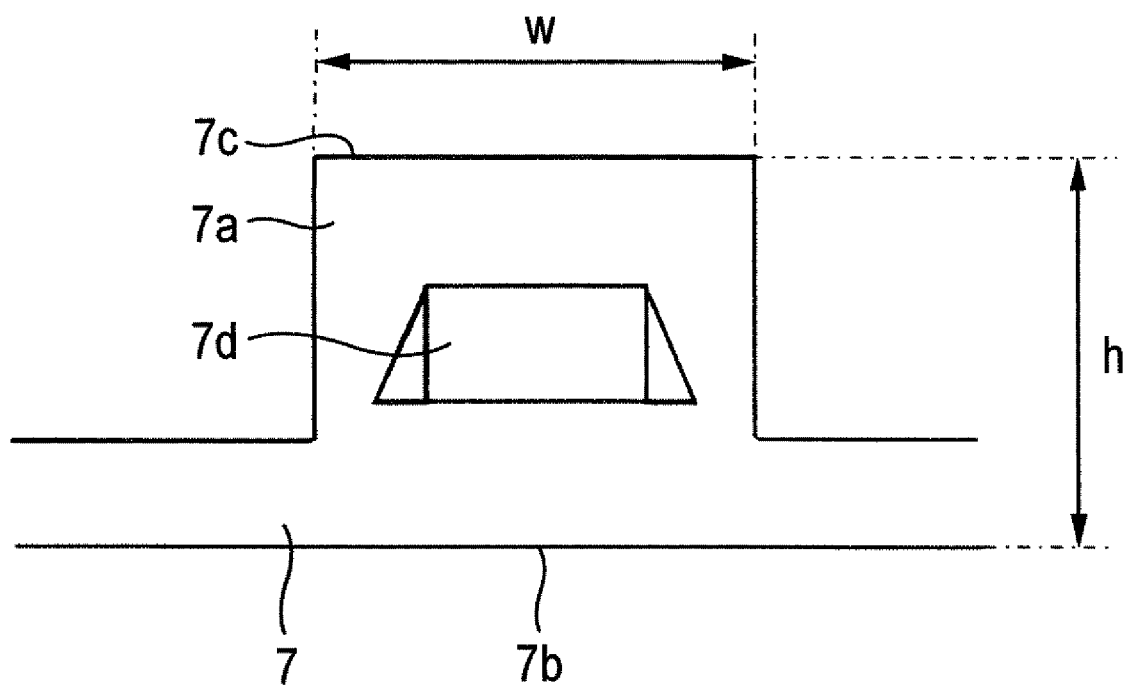
FIG. 3 is a detailed view of Section A shown in FIG. 1.

FIG. 1 is an exploded perspective view of a display device in an embodiment of the invention. FIG. 2 is a cross-sectional view in the II-II' direction of a display device made up of the elements shown in FIG. 1. FIG. 3 is a detailed view of Section A shown in FIG. 1.

Referring to FIGS. 1 through 3, a plurality of light sources 1 using point light sources such as LEDs are arranged at a predetermined spacing and connected to a light source board 2. The light source board 2 is arranged in close proximity to a side 3a of a light guide plate 3. Light from the light sources 1 is incident from the side 3a of the light guide plate 3 and emitted from a light emitting surface 3b of the light guide plate 3 (the light emitting surface refers to the top surface of the light guide plate 3 as seen on a sheet of FIGS. 1 and 2). On the light emitting surface 3b of the light guide plate 3, a diffusing sheet and an optical sheet 5 such as a lens sheet are provided. The diffusing sheet diffuses light from the light sources 1 and uniformly irradiates the display panel 4. The optical sheet 5 changes the angle of the light from the light sources 1 and enhances the luminance on the display surface 4a of the display panel 4 in the front direction. On a counter light emitting surface 3c of the light guide plate 3 (the counter light emitting surface refers to the bottom surface of the light guide plate 3 as seen on a sheet), a reflective sheet 6 is provided to efficiently reflect light from the light sources 1 onto the light emitting surface 3b of the light guide plate 3.

The light source board 2, the light guide plate 3, the optical sheet 5 and the reflective sheet 6 are arranged on the top surface of the rear frame 7 (the top surface refers to the top surface of the rear frame 7 as seen on a sheet of FIGS. 1 and 2) and held by the rear frame 7 and the middle frame 8. The light sources 1, light source board 2, light guide plate 3, display panel 4, optical sheet 5, reflective sheet 6, middle frame 8 and rear frame 7 are supported by the front frame 9 including an opening. While the light sources 1 and light source board 2 are provided on one side surface of the light guide plate 3 alone in FIG. 1, the invention is not limited thereto but the light sources and a light source board may be provided on two or more side surfaces of the light guide plate 3. The light sources 1 are not limited to LEDs, but may be various types of light sources such as Laser Diodes.

The light guide plate 3 contains polyethylene terephthalate (PET), acrylic (PMMA), polycarbonate (PC) or cycloolefin resin or glass. Further, the counter light emitting surface 3c of the light guide plate 3 has a light scattering portion (not shown) for disordering the propagating direction of light and guiding the light to the light emitting surface 3b. The light scattering portion functions as means for extracting light from a light guide plate by disordering the total reflecting condition of light propagating inside the light guide plate. To be more specific, the scattering means for scattering the light includes a method for printing a dot pattern on the counter light emitting surface 3c of the light guide plate 3, a method for making rough the counter light emitting surface 3c, and a method for forming asperities to change the propagating direction of light such as microscopic spheres and prisms on the counter light emitting surface 3c. Providing a light scattering portion on the light emitting surface 3b instead of the counter light emitting surface 3c of the light guide plate 3 obtains the same effect.

The optical sheet 5 may contain diffusing sheets and a lens sheet sandwiched by the diffusing sheets. To enhance the luminance of the display panel 4, a combination of a plurality of lens sheets may be used considering the direction of prisms formed on the surface of the lens sheet. A combination of a plurality of diffusing sheets may be used to improve the diffusing property. The use of the optical sheet 5 is preferably optimized in view of the target luminance and light distribution characteristic.

The reflective sheet 6 contains a material of a mixture of polypropylene (PP) or polyethylene terephthalate (PET) and barium sulfate or titanium oxide, a material of a resin where microscopic air bubbles are formed, a material of a metal plate with silver evaporated thereon, or a material of a metal plate with a coating including titanium oxide.

The front frame 9, which supports the display panel 4 and the middle frame 8 and includes the opening, has fixing claws (not shown) formed in plural positions of the outer edge of the front frame 9 by way of stamping. The fixing claws are bent and caulked to the rear frame and the claw receiving portions (not shown) on the circumference of the rear frame 7.

As shown in FIGS. 1 through 3, in this embodiment, the rear frame 7 contains a metallic material such as aluminum, stainless steel or iron has protruding portions 7a on at least two side surfaces. The protruding portions 7a that are high enough would be used as a guide to sequentially arrange the reflective sheet 6, the light guide plate 3, the optical sheet 5, the middle frame 8 and the display panel 4 on the top surface of the rear frame 7. This facilitates assembly work and skips a process to reverse a display device in the assembly work.

The protruding portions 7a of the rear frame 7 as a position regulating structure for the optical sheet 5 and reflective sheet 6 are sufficiently high compared with the thickness of these members so that they have a high capability of position regulating, thus facilitates the assembly work. This structure suppresses possible displacement of the optical sheet 5 and reflective sheet 6 caused by vibration or impact given to an assembled display device.

By forming the protruding portions 7a on all four side surfaces of the rear frame 7, it is possible to more reliably suppress possible displacement of the light guide plate 3, the optical sheet 5, the middle frame 8 and the display panel 4.

It is not necessary to form position regulating portions respectively for performing position regulation of the reflective sheet 6, the light guide plate 3 and the optical sheet 5 on the middle frame 8. This simplifies the structure of the middle frame 8 and narrows the frame of display device.

It is not necessary to fix the optical sheet 5 to the middle frame 8 with an adhesive material such as an adhesive sheet. It is thus possible to prevent deformation of the optical sheet 5 caused by the difference in the coefficient of linear expansion between the optical sheet 5 and the middle frame 8 thus preventing degradation of display quality. Further, reduced number of components cuts back on the manufacturing costs.

Since the optical sheet 5 is not fixed with an adhesive material such as an adhesive sheet, even in case a fault has taken place in a process, it is easy to make disassembly and reuse the optical sheet 5, which reduces the manufacturing costs.

In the general display devices, it has been necessary for performing the following processes: arranging the light source board 2, the light guide plate 3, the reflective sheet 6 and the rear frame 7 on the reversed middle frame 8; and reversing the middle frame 8, the light source board 2, the light guide plate 3, the reflective sheet 6 and the rear frame 7 as an integrated component; and then performing a lighting test. According to the embodiment of the invention, the light source board 2 is previously fixed to the light guide plate 3 with an adhesive material such as an adhesive sheet or fixing means such as thermal caulking, it is made possible to load the reflective sheet 6 and the light guide plate 3 on the top surface of the rear frame 7, and perform a lighting test in this stage. This can eliminate the need for removing the rear frame 7 when a foreign matter is found. Further, it is made easy to detect a fault caused by a foreign matter introduced in the subsequent assembly processes.

By using a thin FPC (Flexible Printing circuit) as a light source board 2, the external size of the display device is reduced.

While the middle frame 8 generally contains a resin material such as polycarbonate, the middle frame 8 may contain a metallic material such as aluminum, stainless steel or iron thus ensuring sufficient rigidity. As a result, the thickness of the middle frame 8 can be reduced to about 0.2 mm for example as a minimum thickness from about 0.6 mm to allow the middle frame 8 to be formed with a resin material, which reduces the external size of the display device.

The middle frame 8 including an opening has notch portions 8a formed thereon in positions corresponding to the protruding portions 7a formed on the side surface of the rear frame 7 where the protruding portions 7a of the rear frame 7 penetrate. With this shape, the protruding portions 7a on the side surface of the rear frame 7 penetrate the notch portions 8a formed on the middle frame 8 and project toward the display panel 4, which facilitates positioning of the display panel 4 and makes it possible to regulate the horizontal displacement of the display panel 4.

Moreover, between the display panel 4 and the optical sheet 5, a spacing corresponding to the thickness of the middle frame 8 is provided. This prevents the optical sheet 5 from expanding and coming into contact with the display panel 4 and also prevents degradation of display quality.

On the front frame 9, a limiting portion 9a is formed in a position corresponding to and close proximity to the protruding portions 7a of the rear frame 7 penetrating the notch portions 8a of the middle frame 8. By forming the limiting portion 9a on the front frame 9, it is possible to prevent the protruding portions 7a of the rear frame 7 from being deformed by external vibration or impact, thereby more reliably regulating the horizontal displacement of the display panel 4.

As shown in FIG. 2, assuming that the height of the middle frame 8 is T, the height from the bottom surface 7b of the rear frame 7 to the top surface 7c of the protruding portion 7a is h, and the height from the bottom surface 7b of the rear frame 7 to the display surface 4a of the display panel 4 is H, it is preferable that $T<h\leqq H$. The height h from the bottom surface 7b of the rear frame 7 to the top surface 7c of the protruding portion 7a is equal to or smaller than H so that the protruding portion 7a of the rear frame 7 does not project toward the top surface from the display surface 4a of the display panel 4. Thus, the front frame 9 is arranged without getting snagged on the protruding portions 7a of the rear frame 7 thereby enhancing the workability. The height h from the bottom surface 7b of the rear frame 7 to the top surface 7c of the protruding portion 7a is greater than T. This reliably regulates the horizontal displacement of the display panel 4.

As shown in FIG. 3, assuming that the width of the protruding portion 7a of the rear frame 7 is w, it is preferable that $w\geqq 1$ mm. The width w of the protruding portion 7a of the rear frame 7 is equal to or greater than 1 mm so that working of the protruding portion 7a is made easy.

In this way, by providing the protruding portions 7a on the rear frame 7, it is possible to assemble the reflective sheet 6, the light guide plate 3, the optical sheet 5, the middle frame 8, display panel 4 and front frame 9 in this order to the rear frame 7 in one direction without introducing a reversing process in the assembly of the display device. Absence of a reversing process suppresses a fault caused by a foreign matter. Absence of fixation with an adhesive material facilitates disassembly on detection of a fault.

By providing a convex portion 7d at the protruding portion 7a of the rear frame 7 and fitting the rear frame 7 to the middle frame 8 at the notch portions 8a of the middle frame 8 where the protruding portions 7a of the rear frame 7 penetrate, it is possible to simplify the structure of the rear frame 7 and the middle frame 8 without providing the rear frame 7 and the middle frame 8 with respective fitting structures.

While the protruding portions 7a of the rear frame 7 are formed on all four side surfaces of the rear frame 7 in this embodiment, it is possible to arbitrarily determine the positions, number or shape of the protruding portions considering the overall structure so as to allow position regulation of the display panel 4, the optical sheet 5, the middle frame 8, the light guide plate 3 and the reflective sheet 6.

While a plate is used as a light guide plate 3 in this embodiment, the invention is not limited thereto. For example, a wedge-shaped light guide plate 3 whose thickness decreases with distance with the light source 1 allows incident light to be efficiently extracted and the light to be efficiently guided to the light emitting surface 3b.

According to the embodiment of the invention, it is possible to obtain a display device that can have a narrow frame space and also simultaneously regulates the positions of a reflective sheet, a light guide plate, an optical sheet, a middle frame and a display panel by way of protruding portions formed on the middle frame without increasing a manufacturing process or providing a process of reversing the display device in assembly work.

What is claimed is:

1. A display device, comprising:
    a light source;
    a light guide plate including a light emitting surface that emits light incident from the light source;
    a light source board including the light source arranged thereon, the light source board arranged in close proximity to a side surface of the light guide plate;
    an optical sheet disposed on the light guide plate;
    a rear frame arranged to support the light guide plate, the rear frame including
        a planar surface upon which the light guide plate is disposed,
        one or more side walls disposed substantially perpendicular to the planar surface at a perimeter of the planar surface; and
        a protruding portion formed as an extension of the one or more side walls of the rear frame;
    a middle frame disposed so as to secure the light guide plate and the optical sheet to the rear frame, wherein the middle frame includes a notch portion through which the protruding portion of the rear frame penetrates; and
    a display panel whose horizontal position is regulated by the protruding portion of the rear frame penetrating the notch portion of the middle frame.

2. The display device according to claim 1, wherein a plurality of the protruding portions are formed on four side walls of the rear frame.

3. The display device according to claim 1, further comprising a front frame arranged to maintain in alignment with display panel and the middle frame, the front frame including an opening and a concave limiting portion, the limiting portion formed in a position corresponding to and close in proximity to the protruding portion of the rear frame penetrating the notch portion of the middle frame.

4. The display device according to claim 3, wherein the light guide plate, the middle frame, the display panel and the front frame are assembled in this order with respect to the rear frame in one direction.

5. The display device according to claim 1, wherein the protruding portion of the rear frame includes a convex portion having a bottom edge that secures the rear frame to the middle frame by extending over a corresponding surface of the notch portion in the middle frame.

6. The display device according to claim 1, wherein the middle frame is a metallic frame.

7. A method of manufacturing a display device, comprising:
    arranging a light guide plate on a rear frame that includes a protruding portion formed as an extension of one or more side walls of the rear frame;
    arranging an optical sheet on the light guide plate;
    arranging a middle frame to secure the optical sheet to the light guide plate, the middle frame including a notch portion through which the protruding portion of the rear frame penetrates the middle frame;
    arranging a display panel on the middle frame, such that the horizontal position of the display panel is regulated by the protruding portion of the rear frame penetrating the notch portion of the middle frame;
    arranging a front frame on the display panel; and
    fixing the front frame to the rear frame.

* * * * *